(12) United States Patent
Ryu

(10) Patent No.: US 10,562,400 B2
(45) Date of Patent: Feb. 18, 2020

(54) STEERING SYSTEM FOR IN-WHEEL MOTOR VEHICLE

(71) Applicants: Hyundai Motor Company, Seoul (KR); Kia Motors Corporation, Seoul (KR)

(72) Inventor: Sang Woock Ryu, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 181 days.

(21) Appl. No.: 15/816,097

(22) Filed: Nov. 17, 2017

(65) Prior Publication Data

US 2019/0111803 A1 Apr. 18, 2019

(30) Foreign Application Priority Data

Oct. 13, 2017 (KR) ........................ 10-2017-0133595

(51) Int. Cl.
| | |
|---|---|
| *B60L 15/20* | (2006.01) |
| *B62D 6/00* | (2006.01) |
| *B60K 7/00* | (2006.01) |
| *B60G 15/07* | (2006.01) |
| *B60G 13/00* | (2006.01) |
| *B62D 7/22* | (2006.01) |

(52) U.S. Cl.
CPC ........ *B60L 15/2036* (2013.01); *B60G 13/003* (2013.01); *B60G 15/07* (2013.01); *B60K 7/0007* (2013.01); *B62D 6/003* (2013.01); *B62D 7/22* (2013.01); *B60G 2200/142* (2013.01); *B60G 2204/4602* (2013.01); *B60G 2500/40* (2013.01); *B60L 2240/24* (2013.01); *B60L 2240/421* (2013.01); *B60L 2240/461* (2013.01)

(58) Field of Classification Search
None
See application file for complete search history.

(56) References Cited

U.S. PATENT DOCUMENTS

| | | | | |
|---|---|---|---|---|
| 4,219,208 | A * | 8/1980 | Fuller | B62D 7/08 280/89.12 |
| 7,891,472 | B2 * | 2/2011 | Yano | B60G 15/068 188/321.11 |
| 9,085,302 | B2 | 7/2015 | Borroni-Bird et al. | |
| 9,145,169 | B2 * | 9/2015 | Suh | B62D 11/04 |
| 9,376,198 | B2 * | 6/2016 | Anderson | B63H 5/1252 |
| 10,000,124 | B2 * | 6/2018 | Kentley-Klay | G05D 1/0077 |
| 10,207,403 | B1 * | 2/2019 | Wiley | B25J 9/162 |

(Continued)

FOREIGN PATENT DOCUMENTS

| | | |
|---|---|---|
| JP | 2012106524 A | 6/2012 |
| KR | 1020120061478 A | 6/2012 |

(Continued)

*Primary Examiner* — Joseph M Rocca
*Assistant Examiner* — Harold Eric Pahlck, III
(74) *Attorney, Agent, or Firm* — Slater Matsil, LLP

(57) ABSTRACT

The present invention provides a steering system for an in-wheel motor vehicle capable of controlling driving torques and speeds of in-wheel motors mounted in left and right wheels to be different from each other at the time of curve driving of the vehicle to generate a steering angle of the wheel for the curve driving, and performing a steering angle control of sensing the generated steering angle and fixing the steering angle to a desired steering angle.

12 Claims, 6 Drawing Sheets

(56) References Cited

U.S. PATENT DOCUMENTS

| | | | |
|---|---|---|---|
| 10,227,069 B2* | 3/2019 | Lian | B60K 1/00 |
| 2013/0345915 A1 | 12/2013 | Chae | |
| 2015/0083508 A1 | 3/2015 | Bluethmann et al. | |
| 2015/0175203 A1 | 6/2015 | Suh et al. | |
| 2019/0002017 A1* | 1/2019 | Fay, II | B62D 5/061 |
| 2019/0160902 A1* | 5/2019 | Wiley | B60G 5/04 |

FOREIGN PATENT DOCUMENTS

| | | |
|---|---|---|
| KR | 20130023956 A | 3/2013 |
| KR | 101347741 B1 | 1/2014 |
| KR | 101539027 B1 | 7/2015 |
| KR | 101726688 B1 | 4/2017 |

* cited by examiner

[FIG. 1]
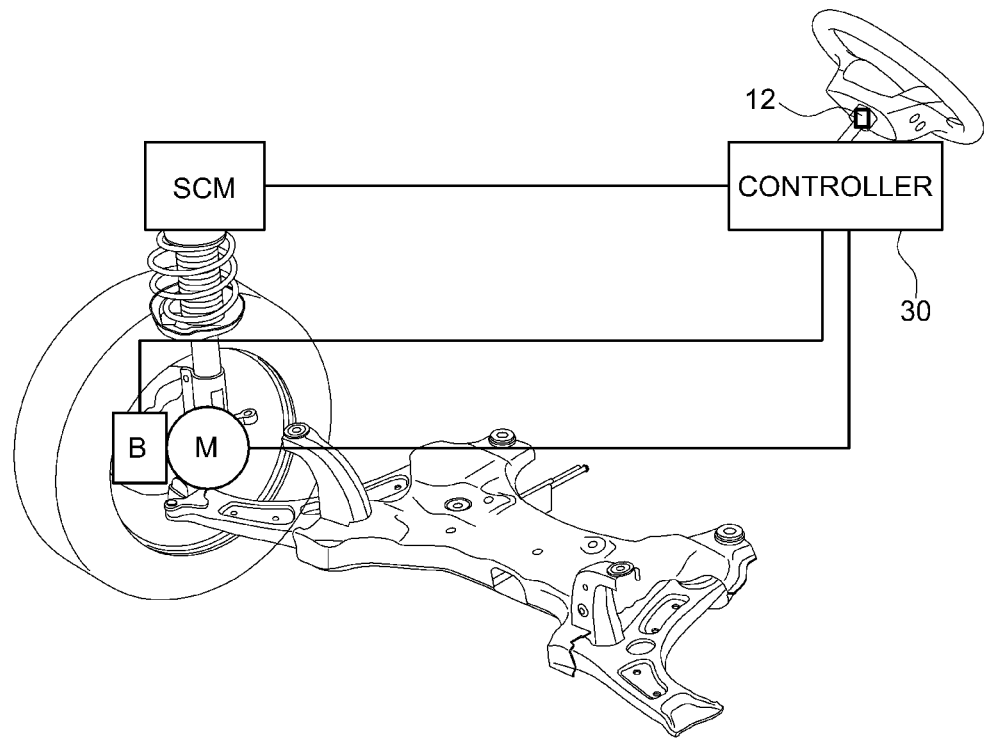
[FIG. 2]
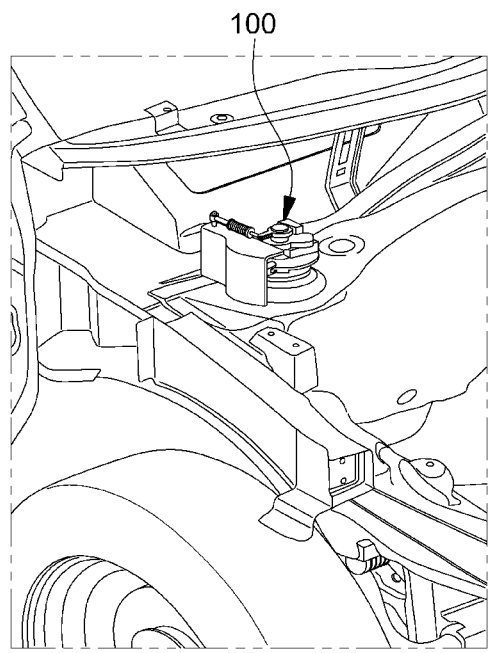

【FIG. 3】
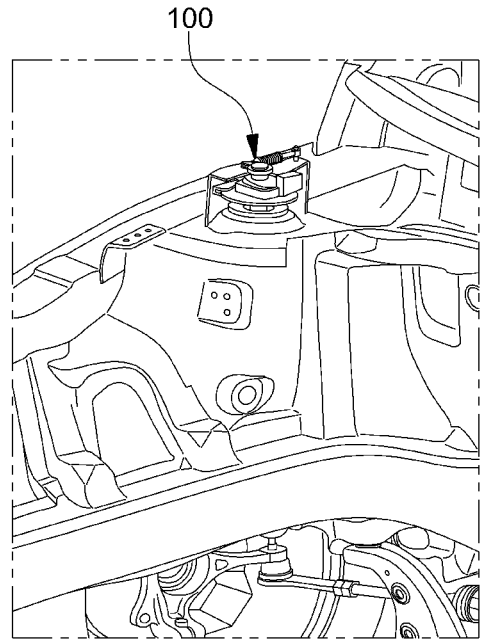
【FIG. 4】
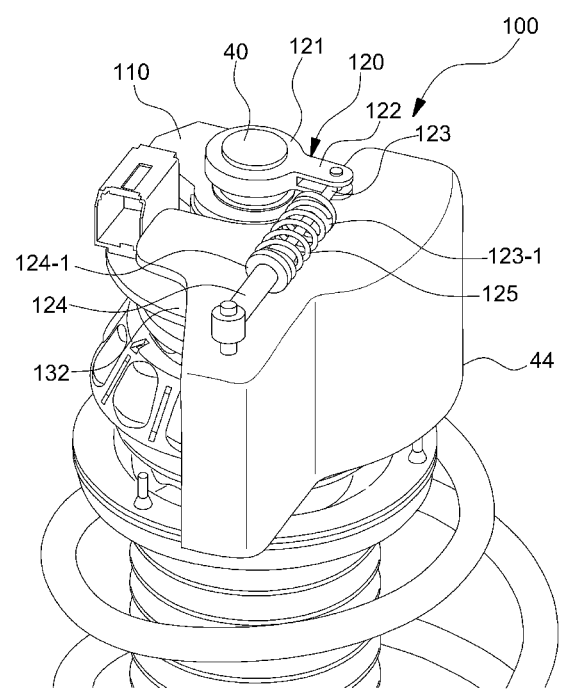

[FIG. 5]
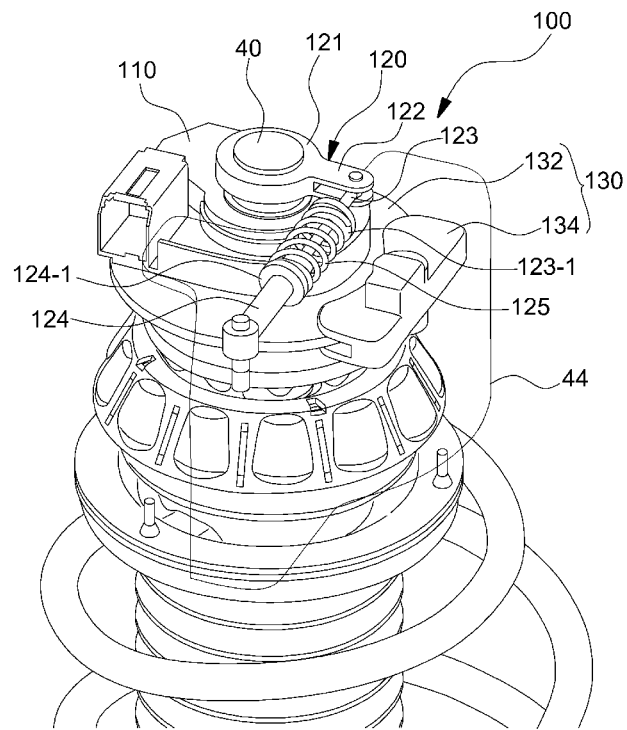
[FIG. 6]
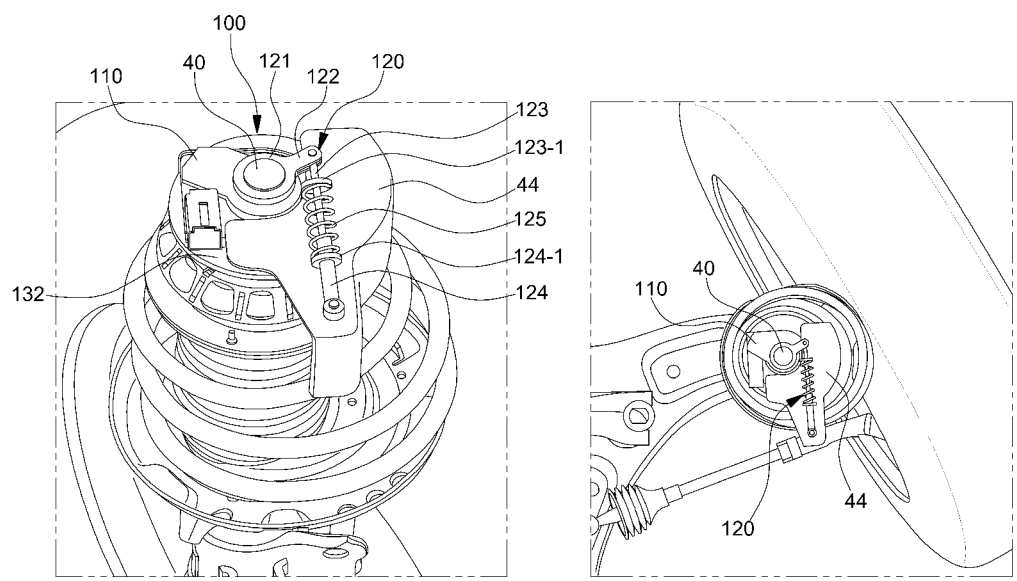

[FIG. 7]
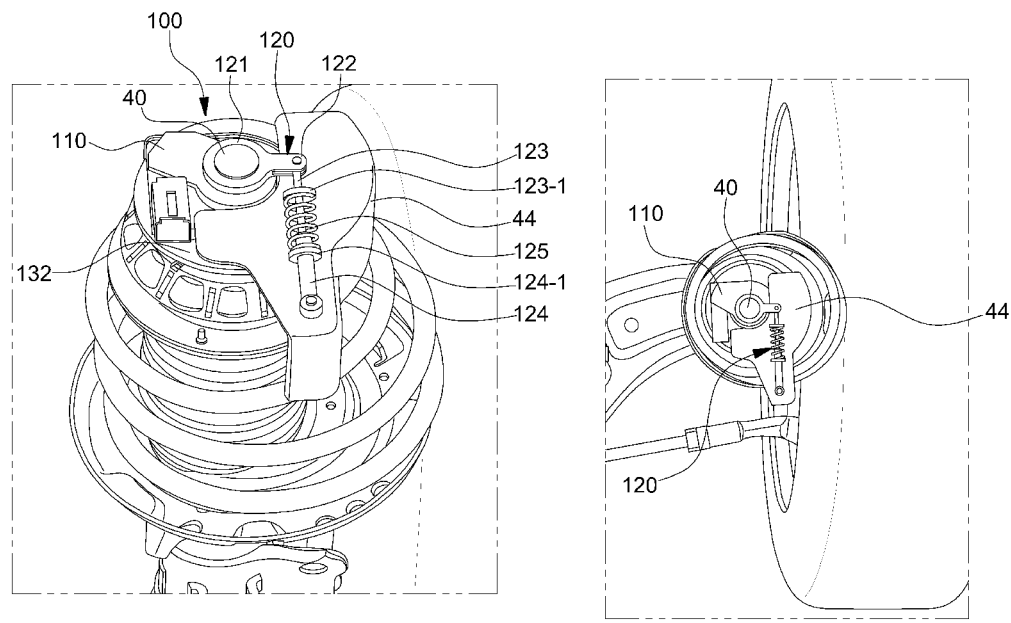
[FIG. 8]
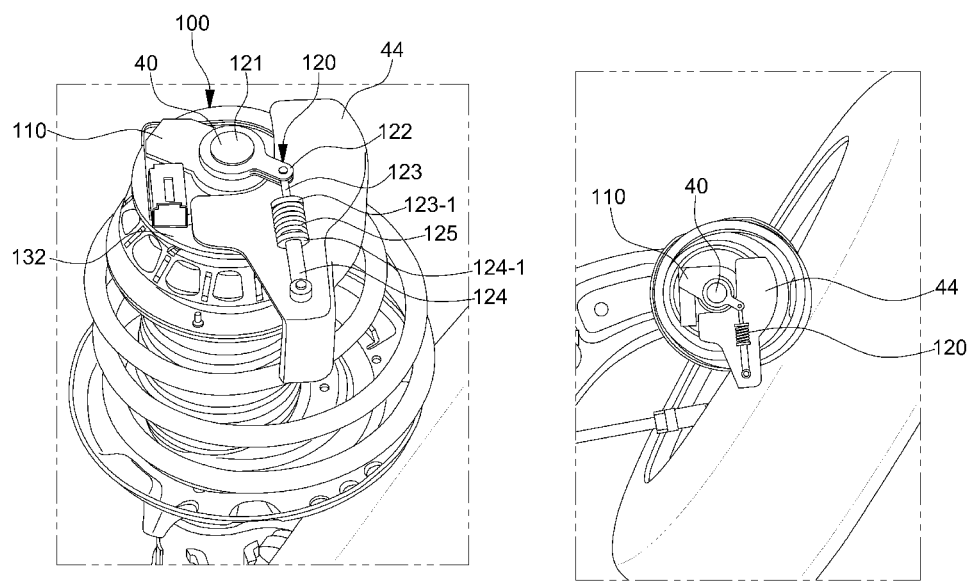

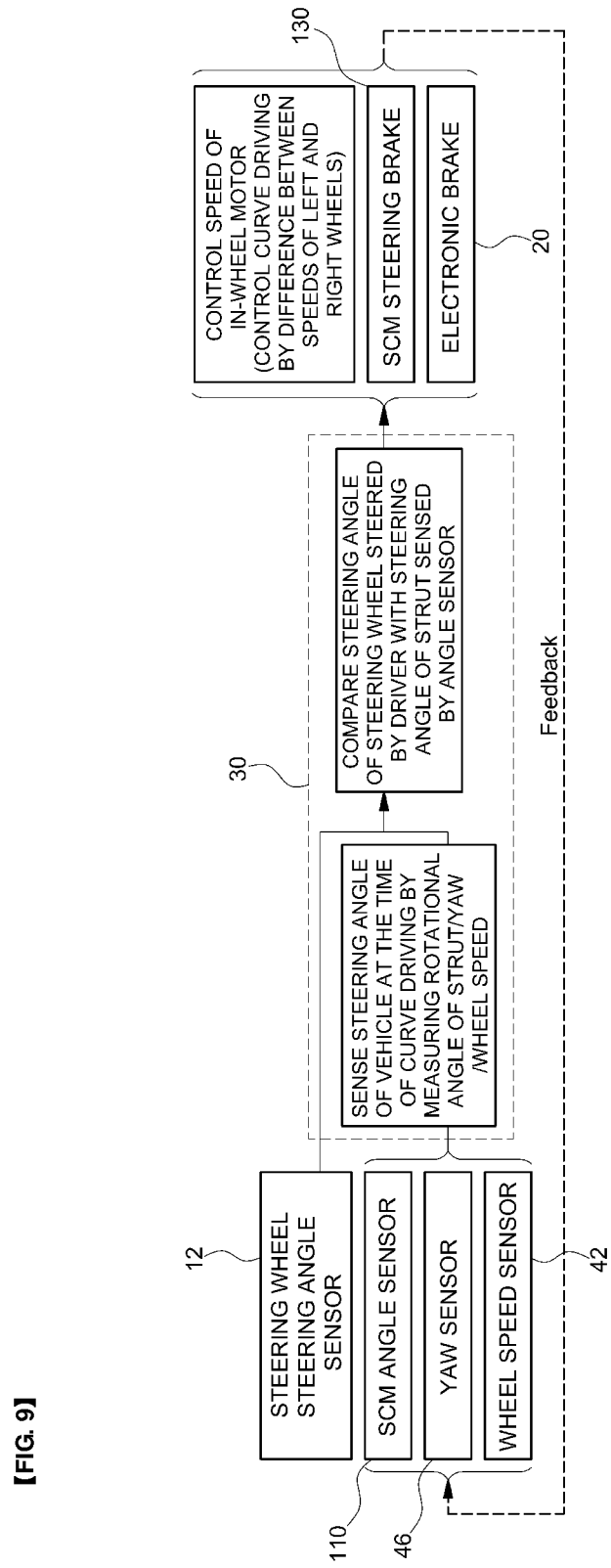
[FIG. 9]

[FIG. 10]
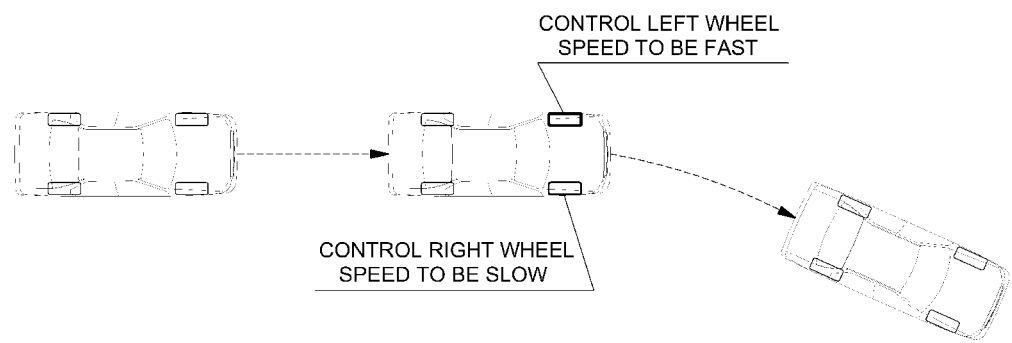
[FIG. 11]
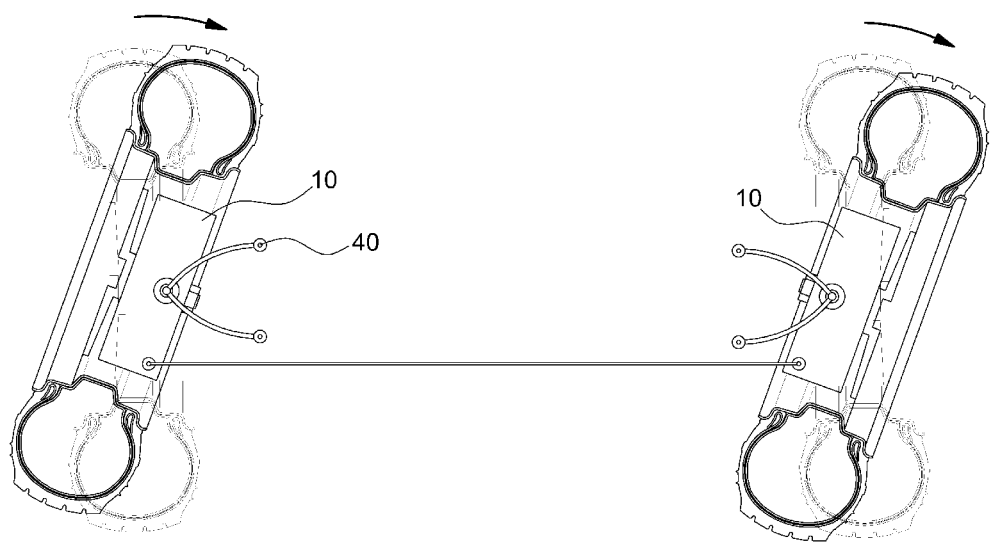

STEERING SYSTEM FOR IN-WHEEL MOTOR VEHICLE

CROSS-REFERENCE TO RELATED APPLICATIONS

This application claims priority to Korean Patent Application No. 10-2017-0133595, filed on Oct. 13, 2017, which application is hereby incorporated herein by reference.

TECHNICAL FIELD

The present disclosure relates to a steering system for an in-wheel motor vehicle.

BACKGROUND

An electric vehicle refers to an environmentally-friendly vehicle that does not discharge exhaust gas at all, and includes a high voltage battery supplying energy for driving, an inverter converting a direct current (DC) power output from the high voltage battery into an alternating current (AC) power, a driving motor for driving the vehicle by generating rotational force by receiving the AC power supplied from the inverter, and the like. The rotational power of the motor is decelerated by a decelerator and then transferred to a wheel through a driving shaft, thereby driving the electric vehicle.

Recently, an in-wheel motor vehicle in which a motor is directly embedded in a rim part of a wheel for mounting a tire to directly transfer the power of the motor to the wheel has been spotlighted, due to advantages that a power train in an intermediate stage such as a decelerator or a differential gear may be omitted to reduce a weight of the vehicle and energy loss in a power transfer process is reduced.

Meanwhile, the existing steering system for an in-wheel motor vehicle includes various complex components such as a steering shaft and column connected to a steering wheel, an electric motor providing steering toque to the steering shaft, a steering gear (rack and pinion) mounted at a lower end portion of the steering shaft, and the like, as applied in a general vehicle with an internal combustion engine, an electric vehicle, a hybrid vehicle, and the like, thereby causing deterioration in package assemblability, an increase in costs and weight, and the like.

The above information disclosed in this Background section is only for enhancement of understanding of the background of the invention and therefore it may contain information that does not form the prior art that is already known in this country to a person of ordinary skill in the art.

SUMMARY

Embodiments of the present disclosure relate to a steering system for an in-wheel motor vehicle. Particular embodiments relate to a steering system for an in-wheel motor vehicle capable of controlling torques and speeds of the in-wheel motors mounted in left and right wheels of the vehicle to be different from each other and adjusting a steering angle, thereby easily performing steering and curve driving of the vehicle. Embodiments of the present invention can solve the above-described problems associated with prior art.

For example, embodiments of the present invention provide a steering system for an in-wheel motor vehicle capable of controlling driving torques and speeds of in-wheel motors mounted at left and right wheels to be different from each other at the time of curve driving of the vehicle to generate a steering angle of the wheel for the curve driving, and performing a steering angle control of sensing the generated steering angle and fixing the steering angle to a desired steering angle, thereby easily performing steering and curve driving of the vehicle.

In one aspect, the present invention provides a steering system for an in-wheel motor vehicle. A steering wheel steering angle sensor senses a steering angle of a steering wheel. A controller controls driving speeds of in-wheel motors mounted at left and right wheels to be different from each other according to the steering angle of the steering wheel sensed by the steering wheel steering angle sensor. A steering control module senses a steering angle of the left and right wheels generated due to a difference between speeds of the left and right wheels by the difference between the driving speeds of the in-wheel motors and adjusts the steering angle of the left and right wheels to a steering angle corresponding to the steering angle of the steering wheel by a steering angle adjustment signal of the controller.

In a preferred embodiment, the steering control module may include a strut shaft fastened to a knuckle arm connected to the left and right wheels and rotating at the same steering angle when the steering angle of the left and right wheels is generated. An angle sensor mounted on the strut shaft senses a rotational angle of the strut shaft as the steering angle and transmits the sensed angle to the controller. A damping device is connected between a yoke mounted on an upper end portion of the strut shaft and a housing mounted in a vehicle body. An electronic steering brake is mounted on the strut shaft in the housing to brake and fix the strut shaft at a desired steering angle.

In another preferred embodiment, the damping device may include a first rod hinge-connected to one end portion of the yoke, a second rod having a hollow structure in which the first rod is accommodated and hinge-coupled to the housing, and a spring disposed to be compressible and stretchable between a support plate of the first rod and a support plate of the second rod.

In still another preferred embodiment, the electronic steering brake may include a disk mounted on an upper portion of the strut shaft, and an electronic caliper applying rotational friction force to the disk by the steering angle adjustment signal of the controller.

In yet another preferred embodiment, the steering system may further include a wheel speed sensor for checking the difference between the speeds of the left and right wheels resulting from the difference between the driving speeds of the in-wheel motors mounted at the left and right wheels and a yaw sensor for checking whether lateral force by the difference between the speeds of the left and right wheels is generated.

In still yet another preferred embodiment, after the steering angle of the left and right wheels is adjusted to the steering angle corresponding to the steering angle of the steering wheel by the steering control module, the controller may control the driving speeds of the left and right in-wheel motors to be different from each other for curve driving of the vehicle.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 1 is a view illustrating a configuration of a steering system for an in-wheel motor vehicle according to an embodiment of the present invention;

FIGS. 2 and 3 are views illustrating an installation position of a steering control module of the steering system for an in-wheel motor vehicle according to an embodiment of the present invention;

FIGS. 4 and 5 are perspective views illustrating the steering control module of the steering system for an in-wheel motor vehicle according to an embodiment of the present invention;

FIGS. 6, 7 and 8 are perspective views illustrating an operating state of the steering control module of the steering system for an in-wheel motor vehicle according to an embodiment of the present invention;

FIG. 9 is a view illustrating a control of the steering system for an in-wheel motor vehicle according to an embodiment of the present invention;

FIG. 10 is a schematic view illustrating a curve driving control after adjusting a steering angle by the steering system for an in-wheel motor vehicle according to an embodiment of the present invention; and FIG. 11 is a plan view illustrating a principle based on which steering angles of left and right wheels are changed by the steering system for an in-wheel motor vehicle according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, preferred embodiments of the present invention will be described in detail with reference to the accompanying drawings.

FIG. 1 illustrates a steering system for an in-wheel motor vehicle according to the present invention. Reference symbol M (and reference number 10 in FIG. 11) indicates an in-wheel motor, and reference symbol B indicates a known electronic brake system (EBS) for braking at the time of driving.

In-wheel motors M are disposed near left and right wheels, respectively, and directly transfer rotational power for driving to tires.

In order to control steering and curve driving of the vehicle in which the in-wheel motor 10 is mounted, a steering angle according to steering of a steering wheel of a driver needs to be sensed first.

For this, a steering wheel steering angle sensor 12 sensing the steering angle of the steering wheel is mounted at a shaft portion of the steering wheel, and the steering angle of the steering wheel sensed by the steering wheel steering angle sensor 12 is transmitted to a controller 30.

The controller 30 controls driving speeds of the in-wheel motors 10 mounted at the left and right wheels to be different from each other according to the steering angle of the steering wheel sensed by the steering wheel steering angle sensor 12.

For example, different torques are applied for the left and right in-wheel motors 10 according to a control signal of the controller, such that the left and right in-wheel motors 10 may be driven at different rotational speeds.

Accordingly, a difference between the speeds of the left and right wheels is generated by the difference between the driving speeds of the left and right in-wheel motors 10, and as illustrated in FIG. 11, a steering angle at which the left and right wheels perform angular rotation in the same one direction is generated by the difference between the speeds of the left and right wheels.

At this time, if the steering angle at which the left and right wheels perform angular rotation is generated, a strut shaft 40 of a suspension fastened to a knuckle arm connected to the left and right wheels also rotates at the same steering angle.

In particular, a steering control module 100 sensing the steering angle of the left and right wheels generated by the difference between the speeds of the left and right wheels by the rotational angle of the strut shaft 40, and controlling the steering angle of the left and right wheels to a steering angle corresponding to the steering angle of the steering wheel is installed on the strut shaft 40.

Referring to FIGS. 2 to 5, the steering control module 100 includes an angle sensor 110 mounted on the strut shaft 40 and sensing a rotational angle of the strut shaft 40 as a steering angle and transmitting the sensed angle to the controller 30, a damping device 120 connected between a yoke 121 mounted on an upper end portion of the strut shaft 40 and a housing 44 mounted in a vehicle body, and an electronic steering brake 130 mounted on the strut shaft 40 in the housing 44 to brake and fix the strut shaft 40 at a desired steering angle.

The damping device 120 buffers and offsets vibration at the time of rotation of the strut shaft 40, and the like, and provides elastic restoring force for restoring the left and right wheels to drive straight again when the steering angle of the left and right wheels is generated.

To this end, the damping device 120 includes the yoke 121 fastened to an outer diameter of the upper end portion of the strut shaft 40 in a press-fitting manner, a first rod 123 hinge-connected to a protruding end 122 formed at one end portion of the yoke 121, a second rod 124 having a hollow structure into which the first rod 123 may enter and hinge-coupled to the housing 44, and a spring 125 disposed to be compressible and stretchable between a support plate 123-1 formed at a middle portion of the first rod 123 and a support plate 124-2 formed at a middle portion of the second rod 124.

Accordingly, if the steering angle at which the left and right wheels perform angular rotation is generated, and the strut shaft 40 also rotates in the same steering angle as described above, the angle sensor no senses the rotational angle of the strut shaft 40 as the steering angle, and transmits the sensed angle to the controller 30.

At the same time, as the strut shaft 40 rotates, the yoke 121 rotates together in the same direction.

Referring to FIG. 6, if the yoke 121 rotates in a counter-clockwise direction (for example, at the time of left-turn of the vehicle), the first rod 123 is drawn out from the second rod 124, and at the same time, the spring 125 is stretched. Referring to FIG. 8, if the yoke 121 rotates in a clockwise direction (for example, at the time of right-turn of the vehicle), the first rod 123 is inserted into the second rod 124, and at the same time, the spring 125 is compressed.

At this time, the elastic restoring force by the stretching and compression of the spring 125 is applied to the yoke 121 and the strut shaft 40 so that the left and right wheels are in a state in which they are arranged to drive straight (state in which the steering angle is zero), thereby improving restorability when the left and right wheels returns to the state of driving straight.

On the other hand, in the straight driving state of the vehicle in which the steering angle is not generated in the left and right wheels, as illustrated in FIG. 7, the strut shaft 40 and the yoke 121 also maintain their original positions, and the spring 120 is maintained in a no-load state.

Meanwhile, the controller compares the steering angle (=steering angle of the left and right wheels) of the strut shaft 40 sensed by the angle sensor no and the steering angle of the steering wheel sensed by the steering wheel steering angle sensor 12, and if the steering angle of the strut shaft 40 coincides with the steering angle of the steering wheel, transmits, to the electronic steering brake 130 of the steering control module 100, a steering angle adjustment signal instructing an adjustment of the steering angle of the left and right wheels to a steering angle corresponding to the steering angle of the steering wheel.

To this end, the electronic steering brake 130 includes a disk 132 mounted on an upper portion of the strut shaft 40, and an electronic caliper 134 mounted at an inner side portion of the housing 44 to apply rotational friction force to the disk 132 by the steering angle adjustment signal of the controller 30.

For reference, as the electronic steering brake 130, an electronic steering brake of which an operating method is similar to that of the electronic brake system for braking the vehicle is used.

Accordingly, as the electronic caliper 134 of the electronic steering brake 130 is in frictional contact with the disk 132 by the steering angle adjustment signal of the controller 30, the strut shaft 40 is stopped and fixed at the steering angle corresponding to the steering angle of the steering wheel. As a result, the steering angle of the left and right wheels is also fixed to the steering angle corresponding to the steering angle of the steering wheel.

Here, an operation flow of the steering system for an in-wheel motor vehicle according to the present invention including the above describe components will be described as below.

FIG. 9 is a view illustrating a control of the steering system for an in-wheel motor vehicle according to an embodiment of the present invention.

First, when a driver steers the steering wheel by a predetermined angle to control steering and curve driving of the vehicle, the steering wheel steering angle sensor 12 senses the steering angle of the steering wheel and transmits the sensed angle to the controller 30.

Then, the controller controls driving speeds of the in-wheel motors 10 mounted at the left and right wheels to be different from each other according to the steering angle of the steering wheel sensed by the steering wheel steering angle sensor 12.

Accordingly, a difference between the speeds of the left and right wheels is generated by the difference between the driving speeds of the left and right in-wheel motors 10, and a steering angle at which the left and right wheels perform angular rotation in the same one direction is generated by the difference between the speeds of the left and right wheels.

At this time, the controller 30 may check whether the difference between the speeds of the left and right wheels is actually generated by receiving a sensing signal of a wheel speed sensor 42 mounted at the left and right wheels, as a kind of fail safe process for checking, by the controller 30, whether the difference between the speeds of the left and right wheels is actually generated as the driving speeds of the left and right in-wheel motors are controlled to be different from each other by an instruction of the controller 30.

Further, whether lateral force is generated due to the difference between the speeds of the left and right wheels may be checked by receiving a sensing signal of a yaw sensor 46, as a kind of fail safe process for checking, by the controller 30, whether lateral force is actually generated to the vehicle due to the difference between the speeds of the left and right wheels.

As described above, if the steering angle at which the left and right wheels perform angular rotation is generated, the strut shaft 40 of the suspension fastened to the knuckle arm connected to the left and right wheels also rotates in the same steering angle, and the angle sensor no senses the change in the rotational angle of the strut shaft 40 as the steering angle, and transmits the sensed angle to the controller 30.

Next, the controller 30 compares the steering angle (=steering angle of the left and right wheels) of the strut shaft 40 sensed by the angle sensor no and the steering angle of the steering wheel sensed by the steering wheel steering angle sensor 12, and if the steering angle of the strut shaft 40 coincides with the steering angle of the steering wheel, transmits, to the electronic steering brake 130 of the steering control module 100, a steering angle adjustment signal instructing an adjustment of the steering angle of the left and right wheels to a steering angle corresponding to the steering angle of the steering wheel.

Accordingly, as the electronic caliper 134 of the electronic steering brake 130 is in frictional contact with the disk 132 by the steering angle adjustment signal of the controller 30, the strut shaft 40 is stopped and fixed at the steering angle corresponding to the steering angle of the steering wheel. As a result, the steering angle of the left and right wheels is also fixed to the steering angle corresponding to the steering angle of the steering wheel by the fixation of the strut shaft 40.

Subsequently, after the steering angle of the left and right wheels is adjusted to the steering angle corresponding to the steering angle of the steering wheel, the controller 30 controls the driving speeds of the left and right in-wheel motors 10 and the rotational speeds of the left and right wheels resulting therefrom to be different from each other for stable curve driving of the vehicle. For example, as illustrated in FIG. 10, when the vehicle turns right, the rotational speed of the left wheel is controlled to be faster than the rotational speed of the right wheel, thereby implementing stable curve driving of the vehicle.

The present invention provides the following effects.

First, steering is performed by a difference between rotation speeds of the in-wheel motors mounted at the left and right wheels, respectively, and the steering angle of the wheel changed accordingly is controlled by the separate steering control module mounted on the strut, thereby easily performing steering and curve driving of the vehicle.

Second, various complex components configuring the existing steering system such as an electric motor providing steering toque to a steering shaft, a steering gear (rack and pinion) mounted at a lower end portion of the steering shaft, and the like are excluded, thereby maximizing an increase in costs and reduction in weight, and contributing to improvement in fuel efficiency by the reduction in weight.

Third, it is possible to secure an assembly and utilization space for other components in packaging, by removing the steering gear, the electric motor for steering, and the like.

What is claimed is:

1. A steering system for an in-wheel motor vehicle, the steering system comprising:
    a steering wheel steering angle sensor configured to sense a steering angle of a steering wheel;
    a controller configured to control driving speeds of in-wheel motors mounted at left and right wheels to be different from each other according to the steering angle of the steering wheel sensed by the steering wheel steering angle sensor; and
    a steering control module configured to sense a steering angle of left and right wheels generated due to a difference between speeds of the left and right wheels resulting from the difference between the driving speeds of the in-wheel motors and to adjust the steering angle of the left and right wheels to a steering angle corresponding to the steering angle of the steering wheel by a steering angle adjustment signal of the controller, wherein the steering control module comprises:
    a strut shaft fastened to a knuckle arm connected to the left and right wheels, the strut shaft rotating at the same steering angle when the steering angle of the left and right wheels is generated;
    an angle sensor mounted on the strut shaft, the angle sensor configured to sense a rotational angle of the strut shaft as the steering angle, and to transmit the sensed angle to the controller;
    a damping device connected between a yoke mounted on an upper end portion of the strut shaft and a housing mounted in a vehicle body; and
    an electronic steering brake mounted on the strut shaft in the housing to brake and fix the strut shaft at a desired steering angle.

2. The steering system of claim 1, wherein the damping device includes:
    a first rod hinge-connected to one end portion of the yoke;
    a second rod having a hollow structure in which the first rod is accommodated, the second rod hinge-coupled to the housing; and
    a spring disposed to be compressible and stretchable between a support plate of the first rod and a support plate of the second rod.

3. The steering system of claim 1, wherein the electronic steering brake includes a disk mounted on an upper portion of the strut shaft, and an electronic caliper configured to apply rotational friction force to the disk by the steering angle adjustment signal of the controller.

4. The steering system of claim 1, further comprising a wheel speed sensor configured to check the difference between the speeds of the left and right wheels resulting from the difference between the driving speeds of the in-wheel motors mounted at the left and right wheels.

5. The steering system of claim 1, further comprising a yaw sensor configured to check whether a lateral force by the difference between the speeds of the left and right wheels is generated.

6. The steering system of claim 1, wherein the controller is configured to control the driving speeds of the left and right in-wheel motors to be different from each other for curve driving of the vehicle, the driving speeds to be controlled after the steering angle of the left and right wheels is adjusted to the steering angle corresponding to the steering angle of the steering wheel by the steering control module.

7. A vehicle comprising:
    a vehicle body;
    a steering wheel within the vehicle body;
    a steering wheel steering angle sensor configured to sense a steering angle of the steering wheel;
    left and right wheels attached to the vehicle body;
    a first in-wheel motor mounted at the left wheel;
    a second in-wheel motor mounted at the right wheel;
    a controller configured to control driving speeds of the first and second in-wheel motors to be different from each other according to the steering angle of the steering wheel sensed by the steering wheel steering angle sensor; and
    a steering control module configured to sense a steering angle of the left and right wheels generated due to a difference between speeds of the left and right wheels resulting from the difference between the driving speeds of the first and second in-wheel motors and to adjust the steering angle of the left and right wheels to a steering angle corresponding to the steering angle of the steering wheel by a steering angle adjustment signal of the controller, wherein the steering control module comprises:
    a strut shaft fastened to a knuckle arm connected to the left and right wheels, the strut shaft rotating at the same steering angle when the steering angle of the left and right wheels is generated;
    an angle sensor mounted on the strut shaft, the angle sensor configured to sense a rotational angle of the strut shaft as the steering angle, and to transmit the sensed angle to the controller;
    a damping device connected between a yoke mounted on an upper end portion of the strut shaft and a housing mounted in the vehicle body; and an electronic steering brake mounted on the strut shaft in the housing to brake and fix the strut shaft at a desired steering angle.

8. The vehicle of claim 7, wherein the damping device includes:
- a first rod hinge-connected to one end portion of the yoke;
- a second rod having a hollow structure in which the first rod is accommodated, the second rod hinge-coupled to the housing; and
- a spring disposed to be compressible and stretchable between a support plate of the first rod and a support plate of the second rod.

9. The vehicle of claim 7, wherein the electronic steering brake includes a disk mounted on an upper portion of the strut shaft, and an electronic caliper configured to apply rotational friction force to the disk by the steering angle adjustment signal of the controller.

10. The vehicle of claim 7, further comprising a wheel speed sensor configured to check the difference between the speeds of the left and right wheels resulting from the difference between the driving speeds of the first and second in-wheel motors mounted at the left and right wheels.

11. The vehicle of claim 7, further comprising a yaw sensor configured to check whether a lateral force by the difference between the speeds of the left and right wheels is generated.

12. The vehicle of claim 7, wherein the controller is configured to control the driving speeds of the first and second in-wheel motors to be different from each other for curve driving of the vehicle, the driving speeds to be controlled after the steering angle of the left and right wheels is adjusted to the steering angle corresponding to the steering angle of the steering wheel by the steering control module.

* * * * *